United States Patent [19]
Klauber

[11] Patent Number: 5,711,624
[45] Date of Patent: *Jan. 27, 1998

[54] KEYBOARD WITH THUMB ACTIVATED BACKSPACE/ERASE KEY

[75] Inventor: Robert D. Klauber, Fairfield, Iowa

[73] Assignee: Keyboard Advancements, Inc., Fairfield, Iowa

[*] Notice: The term of this patent shall not extend beyond the expiration date of Pat. No. 5,143,462.

[21] Appl. No.: 754,169

[22] Filed: Nov. 29, 1996

Related U.S. Application Data

[63] Continuation of Ser. No. 412,765, Mar. 29, 1995, Pat. No. 5,620,267, which is a continuation-in-part of Ser. No. 137,941, Oct. 15, 1993, abandoned, which is a continuation of Ser. No. 813,289, Dec. 19, 1991, abandoned, which is a continuation-in-part of Ser. No. 339,075, Apr. 14, 1989, Pat. No. 5,143,462.

[51] Int. Cl.⁶ ............................................. B41J 5/10
[52] U.S. Cl. ............................................. 400/486; 400/489
[58] Field of Search .......................... 400/486, 485, 400/489, 488, 473, 472

[56] References Cited

U.S. PATENT DOCUMENTS

| | | | |
|---|---|---|---|
| 2,192,594 | 3/1940 | Brand et al. | 197/11 |
| 2,369,807 | 2/1945 | Solon | 197/98 |
| 3,235,055 | 2/1966 | Pagenkopf | 197/100 |
| 3,236,352 | 2/1966 | Schacht | 197/6.6 |
| 3,799,316 | 3/1974 | Davidge et al. | 197/181 |
| 3,970,185 | 7/1976 | Shelton | 197/9 |
| 4,121,048 | 10/1978 | Dev Choudhury | 178/17 C |
| 4,253,774 | 3/1981 | Hanakata et al. | 400/87 |
| 4,332,493 | 6/1982 | Einbinder | 400/484 |
| 4,394,649 | 7/1983 | Suchoff et al. | 340/711 |
| 4,522,518 | 6/1985 | Schmidt | 400/486 |
| 4,613,247 | 9/1986 | McGunnigle | 400/486 |
| 4,698,618 | 10/1987 | Liuzzo et al. | 340/365 R |
| 4,795,349 | 1/1989 | Sprague et al. | 434/156 |
| 4,824,268 | 4/1989 | Diernisse | 400/486 |
| 4,913,573 | 4/1990 | Retter | 400/489 |
| 5,017,030 | 5/1991 | Crews | 400/485 |
| 5,087,910 | 2/1992 | Guyot-Sionnest | 340/711 |

FOREIGN PATENT DOCUMENTS

| | | | |
|---|---|---|---|
| 0228300 | 12/1986 | European Pat. Off. | B41J 29/36 |
| 2000083 | 3/1977 | United Kingdom | B41J 5/10 |

OTHER PUBLICATIONS

BYTE Magazine "A Revolution in Your Pocket" Apr. 1982, vol. 7, No. 4.

ISO Standards, "Final Test of ISO/IEC 9995–1 General Principles governing Keyboard layouts", R. Riess Jun. 20, 1991, ISO/IEC JTC 1/SC 18/WG9 N 893.

*Primary Examiner*—Edgar S. Burr
*Assistant Examiner*—Anthony H. Nguyen

[57] ABSTRACT

A computer, electronic, or other keyboard includes a backspace/erase key positioned such that it enables comfortable activation of the backspace/erase function via thumb movement. Such activation can be accomplished more easily, more efficiently, and more ergonomically effectively than on prior art keyboards because it can be done without averting the eyes from the text copy and does not entail moving or uncomfortable stretching of the hands.

23 Claims, 7 Drawing Sheets

KEYBOARD WITH THUMB ACTIVATED BACKSPACE/ERASE KEY

This application is a continuation application of U.S. patent application Ser. No. 08/412,765 filed Mar. 29, 1995 now U.S. Pat. No. 5,620,267 which is a C.I.P. of abandoned U.S. patent application Ser. No. 08/137,941 filed on Oct. 15, 1993 which was a continuation application of abandoned U.S. patent application Ser. No. 07/813,289 filed Dec. 19, 1991 abandoned which was a C.I.P. of application Ser. No. 07/339,075, U.S. Pat. No. 5,143,462 issued Sep. 1, 1992, filed Apr. 14, 1989.

BACKGROUND OF THE INVENTION

1. Field of the Invention

This invention relates to a backspace/erase key for computer, electric typewriter, and other system keyboards, and more particularly, to an improved method for backspacing and erasing which is easier to use, more ergonomically effective, and permits a touch typist to erase mistakes without having to look at the keyboard.

2. Description of Prior Art

Modern day computer and electric typewriter keyboards have transformed the backspace key of the manual typewriter into a combined function of backspacing plus erasing. This has the advantage of automatically erasing mistakes as one backspaces and is generally considered by users to be an added convenience in typing.

Yet heretofore, with the standard computer or electric typewriter design, the backspace/erase key is located in the far upper right portion of the keyboard, and a touch typist who realizes he has made a mistake must avert his eyes from the copy to the keyboard in order to locate and use the key. Typically, the typist must 1) avert the eyes from the copy to the keyboard, 2) remove the hands from their accustomed location, 3) locate and depress the backspace/erase key, 4) return hands to original position, and then 5) search the copy to find the proper location to begin inputting again.

This is not only an inconvenience but a waste of valuable time as well. Further, it adds to typist fatigue which can lead directly to lower efficiency and poorer quality work.

As an alternative to lifting the entire right hand, the touch typist may stretch with that hand and the right little finger to reach the backspace/erase key. However, this is not only uncomfortable and non-ergonomic, it also oftentimes results in the inadvertent striking of other keys (such as the backslash or enter keys) in proximity to the backspace/erase key. This causes even more error(s) additional to the initial one, resulting in even more inefficiency and hassle.

Some recent keyboard designs attempt to ameliorate this problem by enlarging the backspace/erase key and moving it somewhat closer to the right little finger's resting location. These attempts have been only a minor improvement since the large "return" key is located directly to the right of the right little finger and takes up most of the space which that finger can reach. Even with such designs, most users must still stretch somewhat uncomfortably to reach the backspace/erase key and/or avert their eyes to locate it.

Prior to the present invention there has therefore been no comfortable, easy means to backspace/erase mistakes made on computer or electronic typewriter keyboards without moving one's eyes off of the copy and onto the keyboard, or without uncomfortable and inefficient stretching.

Liuzzo et al, in U.S. Pat. No. 4,698,618, show a backspace key in a non-standard location well to the left of the standard spacebar. However, Liuzzo's backspace key is no mere comfortably activated than the traditional backspace/erase key in the upper right corner of the keyboard. Activating it is cumbersome and inefficient, and certainly not ergonomic. McGunnigle, in U.S. Pat. No 4,613,247, shows a backspace key (not a backspace/erase key) on a specialty mechanical keyboard to the left of the spacebar, but notes that the backspace key is activated by the second or third finger and hence is decidely non-ergonomic and subject to all of the limitations discussed above. Although Schmidt, in U.S. Pat. No. 4,522,518, shows keys in the vicinity of the spacebar, none of such keys is a backspace/erase key and none are conveniently activated by a thumb. Suchoff et al (U.S. Pat. No. 4,394,649) and Pagenkopf (U.S. Pat. No. 3,235,055) show backspace keys far to the right in the row of the spacebar. Both show a key between the backspace key and spacebar key, and both are even more inconvenient and cumbersome than the standard backspace/erase key location. Schacht's (U.S. Pat. No. 3,236,352) automatic marking machine invention has a backspace key to the right of the spacebar, but it is not a backspace/erase key, it is not intended for thumb activation, and it is no more convenient or ergonomic than the traditional backspace/erase key location Solon in U.S. Pat. No. 2,369,807 and EPO patent application 0 228 300 to Brother both show a backspace key at the far left of the spacebar row, but like other prior art inventions, such a location makes use of the backspace key decidedly non-ergonomic and not easy. alsoNone of the aforementioned inventors was motivated by a desire to make use of the backspace/erase key more comfortable, ergonomic, and/or efficient.

Although patents to Brand et al (U.S. Pat. No. 2,192,594), Shelton (U.S. Pat. No. 3,970,185), Hanakata et al (U.S. Pat. No. 4,253,774), Einbinder (U.S. Pat. No. 4,332,493), Diernisse (U.S. Pat. No. 4,824,268), Retter (U.S. Pat. No. 4,913,573), Crews (U.S. Pat. No. 5,017,030), and Guyot-Sionnest (U.S. Pat. No. 5,087,910) each show key(s) which are thumb activated, each is an anomolous design input device beating little resemblance to the standard modern keyboard in such widespread and commonly accepted use today. None of the distinguishing features of these designs could be incorporated into the standard arrangement of alphanumeric keys (the "ISO standards" arrangement) used virtually exclusively by touch typists around the world. Unlike the present invention, each of these other inventions is either intended for use other than normal word processing typing, or is simply not capable of being integrated into existing standard alphanumeric key layouts.

In addition, there is also, at present, no comfortable, easy means to move the cursor (or typing mechanism) in discrete steps on standard size and design computer or electronic typewriter keyboards without moving the hands from their accustomed touch typing position, stretching of the hands uncomfortably, and/or averting the eyes to look at the keyboard.

The problems inherent with backspace/erase and cursor movement are also relevant to other non-alphanumeric keys. The home, end, page up, page down, escape, delete, insert, tab, backslash, control, and function keys, in practical applications using standard touch typing keyboards, have entailed activation by the fingers, averting of the eyes from the copy material, and moving or uncomfortable stretching of the hands. Such prior means for activation of non-alphanumeric keys is, of necessity, cumbersome and inefficient. The present invention also extends the inventor's insight for the backspace/erase key to other non-alphanumeric keys.

OBJECTS AND ADVANTAGES OF THE INVENTION

Accordingly, several objects and advantages of my novel method for backspace/erase are to save the typist the need to avert the eyes from the copy and to avoid stretching uncomfortably, thereby improving ease of use, saving of wasted time, reducing fatigue, and increasing typing efficiency.

Accordingly, several additional objects and advantages of the present novel means for activation of other non-alphanumeric keys includes a method or means for cursor (or typing mechanism) movement which permits easy, ergonomic, movement of the cursor (or typing mechanism) via thumb movement without having to move the hands to a different location, avert the eyes from the text, stretch uncomfortably, or employ a larger keyboard footprint. This will be less fatiguing on the typist, increase accuracy and efficiency, and provide greater convenience in positioning text within any document.

Further objects and advantages of the invention will become apparent from a consideration of the ensuing description of it.

SUMMARY OF THE INVENTION

This backspace/erase key invention solves all of the problems associated with such a key on prior art keyboards.

The invention takes advantage of the facts (1) that prior keyboards are designed such that one or both thumbs are used solely to depress the space bar and for no other function, (2) that the spacebar typically takes up by far the most space of any key on the keyboard, (3) that virtually all touch typists use only one specific thumb (studies indicate this is the right thumb for 97% of touch typists) exclusively to space, and (4) that the other thumb is never used at all. In my invention, in various embodiments, one or both thumbs are used to activate both spacebar and/or backspace/erase keys. In a typical embodiment one thumb would be used to space (usually, but not necessarily the right thumb), and the other would be used to backspace/erase.

Any method whereby one thumb, either thumb, or both thumbs are used to backspace/erase comfortably comprises my invention. This may comprise, but is not limited to, splitting the standard spacebar into two or more sections with one or more of these sections used for backspace/erase and one or more of the sections used for spacebar. It may also comprise one or more additional keys placed conveniently near the thumbs so that one or two thumbs can be used for backspace/erasing without averting the eyes from the copy. These locations could be on either the far (opposite) side or the near (same) side of the spacebar from the typist.

The present invention comprises one or more backspace/erase keys located on a standard keyboard (having a separate key for each alphanumeric character) such that said key(s) may be within reach of at least one thumb of a touch typist. In the context of the present invention, the term within reach of a thumb shall be interpreted as within comfortable range of a thumb such that a touch typist with hands in touch typing position may comfortably employ thumb activation of key(s) without removing the hands from the touch typing position, looking at the keyboard, or uncomfortable or unusual stretching of the hands.

In various other embodiments of the present invention, one or both thumbs may be used comfortably to activate one or more other non-alphanumeric keys. The present invention comprises one or more non-alphanumeric keys located on a standard touch typing type of keyboard such that said key(s) may be within comfortable reach of at least one thumb of a touch typist.

Other embodiments are possible in which a given non-alphanumeric key can have more than one function associated with it. For example, a left arrow cursor movement key may function as a backspace/erase whenever the control (or alt or shift or other key) is simultaneously depressed. Using such multiple function assignations, it is possible to provide many thumb activated non-alphanumeric functions with only one or more keys placed in close proximity to the touch typists thumbs. For example, the split spacebar with right part for spacing, left for backspace/erasing may function such that depression of the shift (or control or alt or other) key along with the left part of the split spacebar effects left cursor movement; and depression of the shift (or control or alt or other) key along with the right part effects right cursor movement This would provide the touch typist the advantage of being able to move the cursor forward and backward along a given line to correct mistakes in other locations of the text comfortably, without having to avert the eyes from the text or stretch the hands uncomfortably.

Many other embodiments may become obvious to those skilled in the art. Any method or apparatus whereby non-alphanumeric keys on standard touch typing keyboards are located within comfortable reach of one or both thumbs of a touch typists hands when in touch typing position comprises the present invention. The invention therefore comprises any keyboard wherein one or more non-alphanumeric keys are located in any region which in traditional keyboards has typically been occupied by some part of the spacebar.

The invention, in its various embodiments, solves the problems associated with prior art in a superior and wholly satisfactory manner.

DETAILED DESCRIPTION OF THE INVENTION

Previous art keyboards have not provided touch typists with ergonomically effective means to backspace and erase mistakes without averting the eyes from the copy. The present invention, in different embodiments, involves alternative methodologies which solve this and other problems associated with prior art. It does this by using one or both thumbs to activate the backspace/erase key, thereby removing the impediments of having to avert the eyes from the copy and/or having to stretch unnecessarily to backspace/erase.

Any method employing one or both thumbs in any combination to backspace/erase comfortably while touch typing on a keyboard having the presently widely accepted standard alphanumeric key layout (for split or non-split keyboard layouts) comprises my invention.

Figure 2:
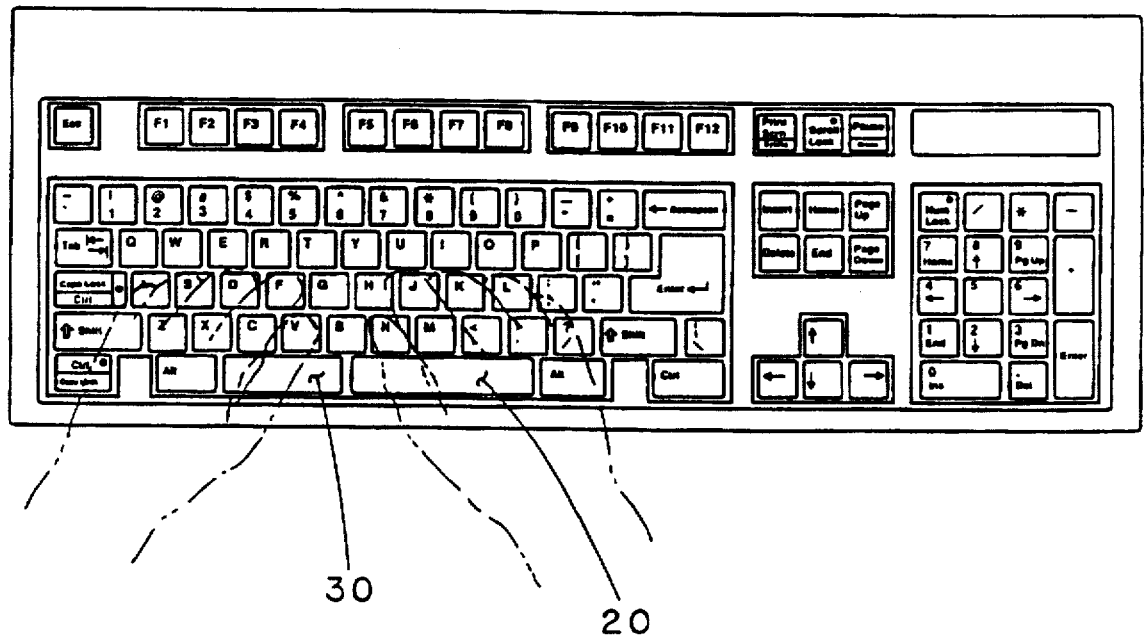
FIG. 2 depicts one embodiment of the present invention with a non-alphanumeric key within comfortable reach of the left thumb of a typist having fingers positioned in touch typing position.

In the embodiment of FIG. 2, the standard spacebar becomes divided into two separate bars, possibly, but not necessarily, of equal length. One of these (20 or 30) may be used by one of the thumbs to provide spaces with the other (20 or 30) used by the other thumb to activate an non-alphanumeric function such as backspace/erase. The most advantageous arrangement would be with the right bar (20 in FIG. 2) as a spacebar and the left bar 30 as a backspace/erase bar, since the vast majority of touch typists space exclusively with the right thumb. Alternatively, the user could use the same thumb to activate either the spacebar key 20 or the non-alphanumeric key 32 such as a backspace/erase key (see FIG. 3). Hence the user can readily correct mistakes simply, easily, and efficiently without taking the eyes off of the copy or stretching uncomfortably.

A second embodiment entails division of the standard spacebar into three or more sections with one of these sections, possibly, but not necessarily, the middle one, used by either thumb the typist chooses to backspace/erase. (See FIG. 4 where 20 may be a backspace/erase key, or 36 or 38 may be a backspace/erase key.) The other sections could maintain the standard function of spacing. Alternatively, one or more of these other sections then might take on yet one or more other functions.

A third embodiment entails introduction of one or more additional keys, possibly but not necessarily elongated, close to the location of the standard spacebar which could be used by one, either, or both thumbs to backspace/erase. See FIGS. 5 through 10 where any of the labeled elements could be space keys or non-alphanumeric keys such as backspace/erase. Any of these non-alphanumeric keys, including the backspace/erase key or the tab key, could be located on the side of the spacebar opposite the touch typist or on the side of the spacebar nearest the touch typist.

A fourth embodiment comprises a key which registers a space when one thumb activates it but registers a backspace/erase when both thumbs activate it. Alternatively, a space could be activated by both thumbs and a backspace/erase by only one.

A fifth embodiment comprises a single elongated key which registers a space when one region of it, such as but not limited to one side, is activated, and registers a backspace/erase when another region of it, such as but not limited to the other side, is activated.

Yet another embodiment comprises two keys either of which registers a space when activated individually but registers a backspace/erase when both are activated simultaneously.

Still another embodiment comprises using another key, such as but not limited to the shift key of the control key, or the air key in conjunction with a thumb activated key in order to backspace/erase. The user activates the other key then activates via movement of one or both thumbs a second key such as, but not limited to, the spacebar in order to backspace/erase. These two keys could be activated simultaneously or sequentually.

In addition, previous art keyboards have not provided a simple, ergonomic, effective means whereby the touch typist could move the cursor around the document being prepared. Cursor movement was not possible without averting the eyes from the copy, moving at least one hand from its accustomed location, and/or unnatural stretching or motion of the hands. In similar fashion, activation of other non-alphanumeric keys is equally as cumbersome. The present invention, in different embodiments, involves an alternative methodology which solves this and other problems associated with prior art.

It does this by positioning one or more non-alphanumeric key(s) on the keyboard such that one or two thumbs can comfortably activate said keys. This invention has its origin in the inventor's original observation that each finger, as used in touch typing, has anywhere from 3 to 8 different jobs, i.e., hit different keys. Both thumbs together, in contrast, perform a total of one job, i.e., spacing. In addition, the spacebar on typical keyboards occupies far more space than any other key, and far more space than is ever needed by the thumbs to activate it. Since computer and keyboard manufacturers are continually trying to improve their keyboard layouts by more efficient use of the space and arrangement of keys (without modification of the basic layout of the non-alphanumeric keys), it makes good sense to reduce the size of the spacebar to the area only used by the thumbs when actually depressing said spacebar. The space saved thereby could then be used for other commonly used keys (typically other than non-alphanumeric keys) such as the cursor right, cursor left, cursor up, cursor down, home, end, page up, page down, escape, functions like cntrl, F1, F2, etc, insert, backslash, delete, tab, and backspace/erase keys. This not only saves space and uses the available area more effectively, but perhaps more importantly, can make touch typing itself more ergonomic, thus reducing fatigue of the typist while increasing accuracy and speed.

Many possible arrangements and combinations exist wherein comfortable thumb activation of non-alphanumeric functions are possible and will be evident to those skilled in the art. The invention is not limited to any subset of the various arrangements and combinations. The embodiments shown below are not meant as limitations on the invention, and the invention transcends the particular arrangements shown in these embodiments. Any arrangement of non-alphanumeric keys wherein activation of one or more of said keys via comfortable thumb movement is possible is comprised by my invention. Although emphasis herein is on the particular non-alphanumeric keys which move the cursor, the invention applies to all other non-alphanumeric keys as well.

Any means, such as contact switches, etc., which may be used to effect electrical contact and cause input of the appropriate signal representing a given key may be employed. Such means are well known to those skilled in the art, and the present invention offers no alternative structure to the traditional methods and means for accomplishing appropriate electrical activation of a key. Nor does it offer alternative underlying mechanical structure for any keys. Rather, it comprises all such electrical and mechanical means known to those skilled in the art. Such means include the use of keys in combination, e.g. simultaneous depression of a key such as an alt, control, or shift key along with a given key may change the function of said given key. The present invention comprises re-arrangement of the location and in some cases the mechanical shape and size of keys, and otherwise merely incorporates known means, devices, and methods for electric or electronic signal activation.

Figure 1:
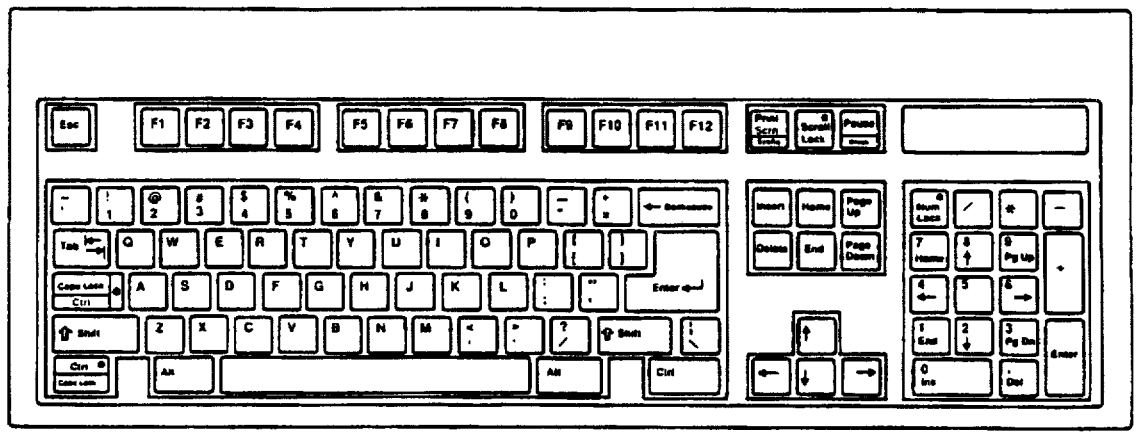
FIG. 1 depicts a standard prior art keyboard showing typical locations for the cursor movement, home key, end key, and other non-alphanumeric keys.

One general non-alphanumeric key embodiment is illustrated in FIG. 2. It comprises spacebar 20 and non-alphanumeric key 30 when the non-alphanumeric key 30 occupies a region of the keyboard which in typical prior art is located in, or near, the region of the left part of the spacebar 18 (FIG. 1.) Spacebar 20 of this embodiment may be of shorter length than that of the typical spacebar 18 to accommodate judicious positioning of non-alphanumeric key 30, although this is not necessary. The non-alphanumeric key 30 may be any of the cursor right, cursor left, cursor up, cursor down, home, end, page up, page down, escape, functions like cntrl, F1, F2, etc, insert, backslash, delete, tab, and backspace/erase keys. Non-alphanumeric key 30 in FIG. 2 is situated in an end-to-end position with, and at the right side of spacebar 20. Their ends may be juxtaposed or there may be a space between the two keys, or there may even be one or more other keys between spacebar 20 and non-alphanumeric key 30.

Non-alphanumeric key 30 may have multiple functions. For example, it may be the backspace/erase key when no other keys are activated either simultaneously with or just prior to it, but it may have other functions when used in tandem with one or more other keys, such as the shift, alt, and control keys. In one case, by holding down the shift key, backspace/erase key 30 may function as a left cursor movement key. By holding down the control key, it may function as a right cursor movement key. In this manner, a touch typist could move left or right on a given line and backspace/erase whatever sections he or she chooses. Additionally, depressing the alt key along with key 30 may cause key 30 to function as an end key. With this added feature the touch typist could move left or right along a line to correct mistakes, and when the mistakes are corrected, simply move quickly and efficiently to the end of the line to begin inputting additional material.

In similar fashion, key 20, which functions normally as a spacebar, may have alternative functions associated with it as well. For example, depression of the shift key prior to or simultaneously with key 20 may cause key 20 to function as a right cursor movement key. Depression of the alt key or the control key in tandem with key 20 may cause key 20 to function as an end key or a home key. Combining the multiple functionality of both keys 20 and 30 may result in a very effective way for the touch typist to move around a document and make corrections without having to avert the eyes from the copy or stretch the hands uncomfortably. One possible combination is shown below:

| In tandem with | key 30 function | key 20 function |
| --- | --- | --- |
| nothing (alone) | backspace/erase | space |
| shift key | left cursor | right cursor |
| control | home | end |
| alt | delete | delete |

Other combinations may include cursor up and/or cursor down as alternative key 30 and/or key 20 functions in lieu of any of those shown above. Still other possible combinations may include one or more additional editing functions such as backspace/erase one word per activation and/or delete one word per activation.

Many other possible manifestations of this embodiment would be obvious to those skilled in the art and listing them herein would be an exhaustive process. Any number of different combinations of key 20 and/or key 30 with one or more keys such as the shift, alt, and control keys may result in a wide range of useful combinations of non-alphanumeric key functions. All such combinations are comprised by the present invention.

Further, in this or any embodiment shown or implied, the various functions may be programmable or otherwise chosen by the user (using auxiliary switches, for example) to suit the users desire's. Also, keys which perform any function discussed herein may be left in their standard prior art locations and the keys (such as 20 and 30 and others to be discussed below) which perform like functions merely used in addition, as an added aid to the typist. Maintenance of the original keys may, or may not, be employed.

In this and other embodiments, key 20 is typically the spacebar key. However, key 20, may, in any embodiment, be any other non-alphanumeric key. For example, in the present embodiment, the functions of key 20 and key 30 in FIG. 2 may be exchanged with one another from that described hereinbefore. In all embodiments shown or implied herein, the function of key 20 may be similarly exchanged with any other non-alphanumeric key.

Figure 3:
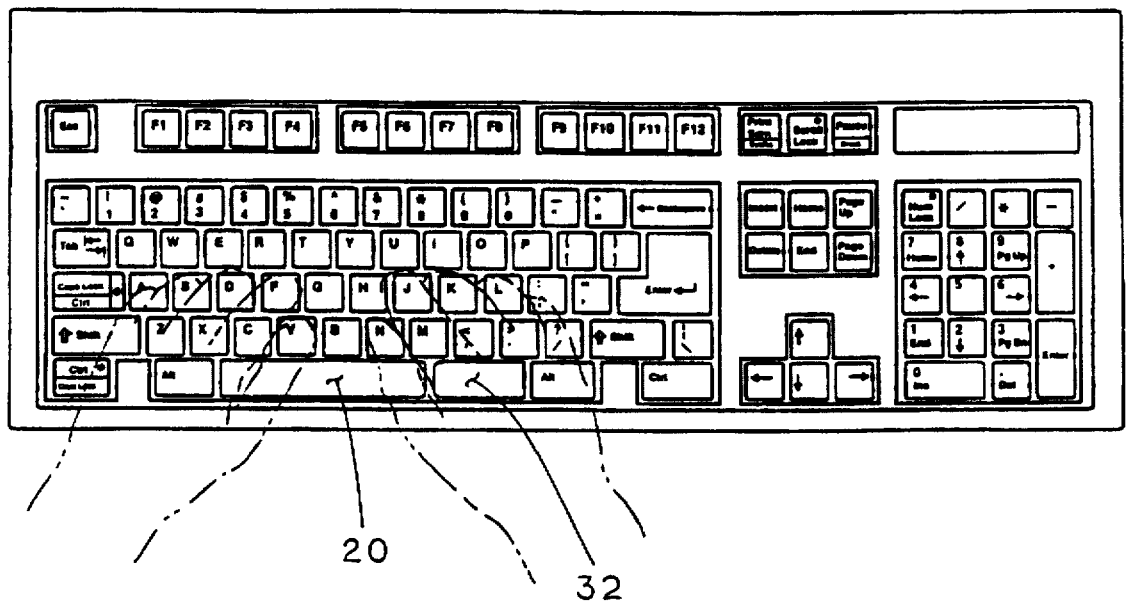
FIG. 3 shows another embodiment of the present invention with a non-alphanumeric key within comfortable reach of the right thumb of a typist having fingers positioned in touch typing position.

A another embodiment is shown in FIG. 3 and comprises a non-alphanumeric key 32 located to the right of spacebar 20. Key 32 functions in a similar manlier as does key 30 in the prior embodiment. That is, it can function as any non-alphanumeric key such as the cursor right, cursor left, cursor up, cursor down, home, end, page up, page down, escape, function like cntrl, F1, F2, etc., insert, backslash, delete, tab, and backspace/erase keys. In addition, it may have multiple functions when used in tandem with one or more keys such as the shift, alt, and control keys just as key 30 has. Further, key 20 may have such multiple functions as well. All comments mack with respect to keys 20 and 30 above are equally applicable to keys 20 and 32 in this embodiment.

Other embodiments wherein the additional key (e.g., 30 or 32) is placed either above or below (nearer or further from the typist than) the spacebar (20 or 18) are also comprises by the invention. All comments made in the discussions of embodiments 1 and 2 are also applicable to these other configurations.

Figure 4:
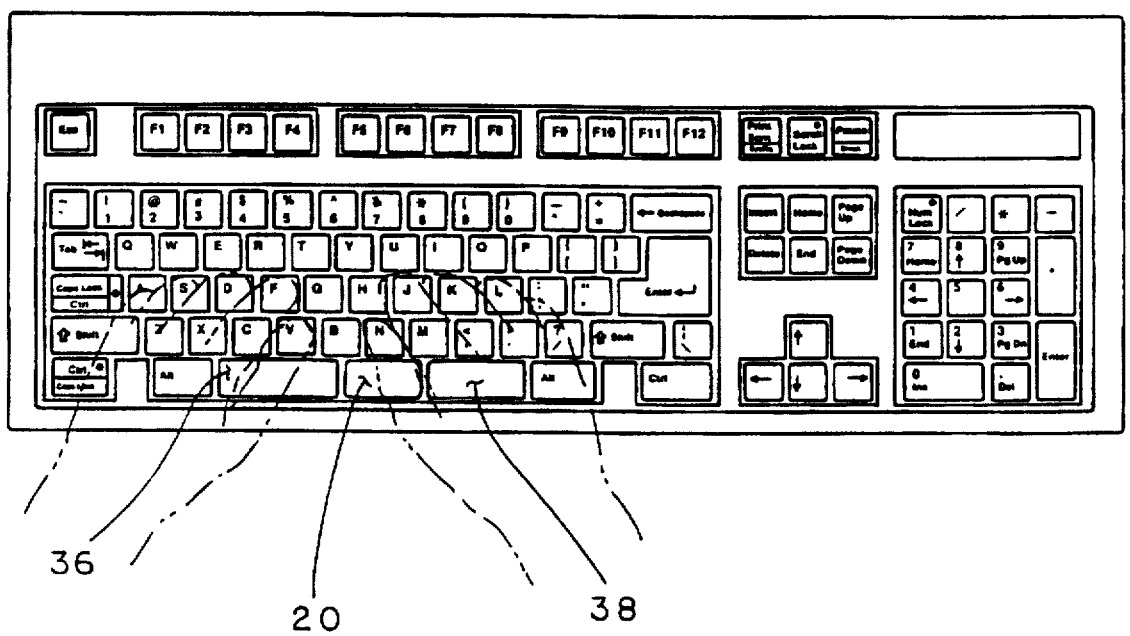
FIG. 4 shows another embodiment of the present invention with generic non-alphanumeric keys on either side of the spacebar such that any of said keys may be activated comfortably with the thumbs.

FIG. 4 illustrates another embodiment of the invention in which keys 36 and 38 are located on either sides of the spacebar 20. These keys function much like keys 30 and 32 do in earlier embodiments but the availability and number of functions is enhanced. For example, key 36 may be a backspace/erase key. Key 38 may be a delete key. Or keys 36 and 38 may be cursor left and cursor right keys. Or 36 may be a backspace/erase key with 38 as a left arrow key. 38 or 36 may then also function as a right arrow when used in tandem with another key such as the shift, control, or alt keys. As with previous embodiments, many possible such combinations would be obvious to those skilled in the art, and any and all such combinations are comprised by the invention. Some of these possibilities are shown in the tables below.

| in tandem with | key 36 function | key 20 function | key 38 function |
| --- | --- | --- | --- |
| nothing (alone) | left arrow | space | right arrow |
| shift, alt, or control | up arrow | backspace/erase | down &row |
| one of above not used | home | (possibly delete) | end |
| the third of the above | page up | (insert or escape) | page down |

| in tandem with | key 36 function | key 20 function | key 38 function |
| --- | --- | --- | --- |
| nothing (alone) | backspace/erase | space | delete |
| shift, alt, or control | cursor left | (escape or insert) | cursor right |
| one of above not used | home | (escape or insert) | end |
| the third of the above | cursor up | | cursor down |

| in tandem with | key 36 function | key 20 function | key 38 function |
| --- | --- | --- | --- |
| nothing (alone) | backspace/erase | space | delete |
| shift, alt, or control | cursor left | (escape or insert) | cursor right |
| one of above not used | back/erase 1 word | cursor up | delete one word |
| the third of the above | cursor left 1 word | cursor down | cursor right 1 word |

Further, in this or any embodiment, key 20 need not be a spacebar. For example, the functions of key 20 and key 36 in the above tables, or in any other suitable configuration, may be interchanged. Similarly, the functions of key 20 and key 38 may be interchanged as well.

Any parts of the above descriptions may be used without incorporating other parts. For example, only line one (the key alone with nothing in tandem) of any of the above tables (or sibling configurations of the above tables) may be incorporated without any of the others. Or alternatively only any two or three lines of any of the above may be used. Further, as with all other embodiments, any combinations of functions not specifically shown herein yet corresponding in spirit to the concept of non-alphanumeric key activation by comfortable thumb movement is comprised by the invention. This includes multiple function use of any such keys as well.

Figure 5A:
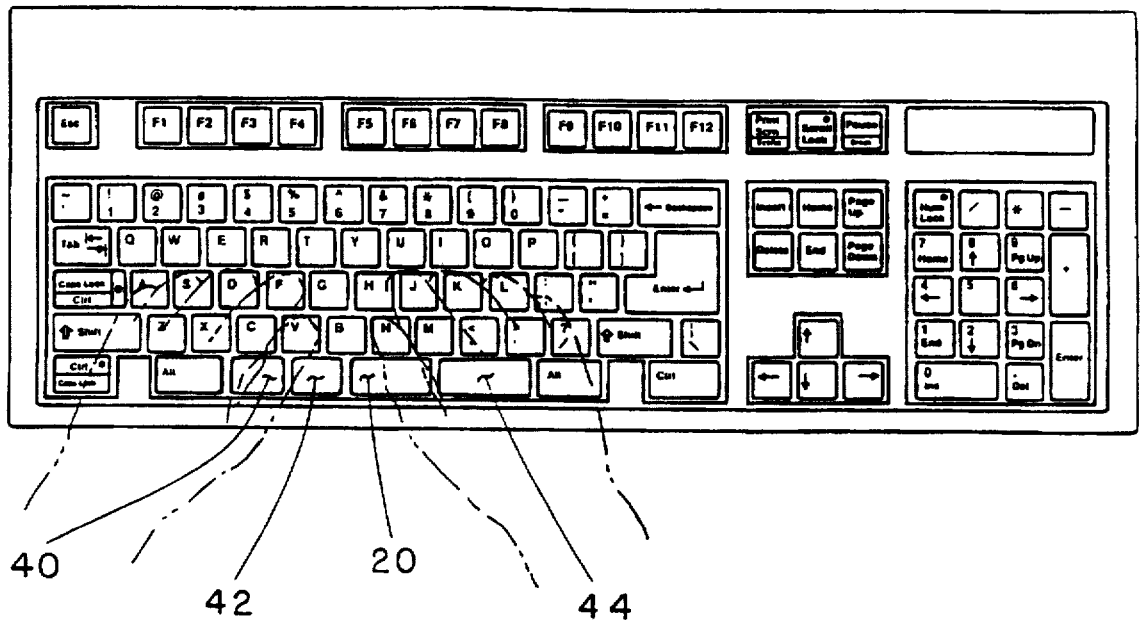
FIG. 5 shows another embodiment of the present invention with additional generic non-alphanumeric keys.
Figure 5B:
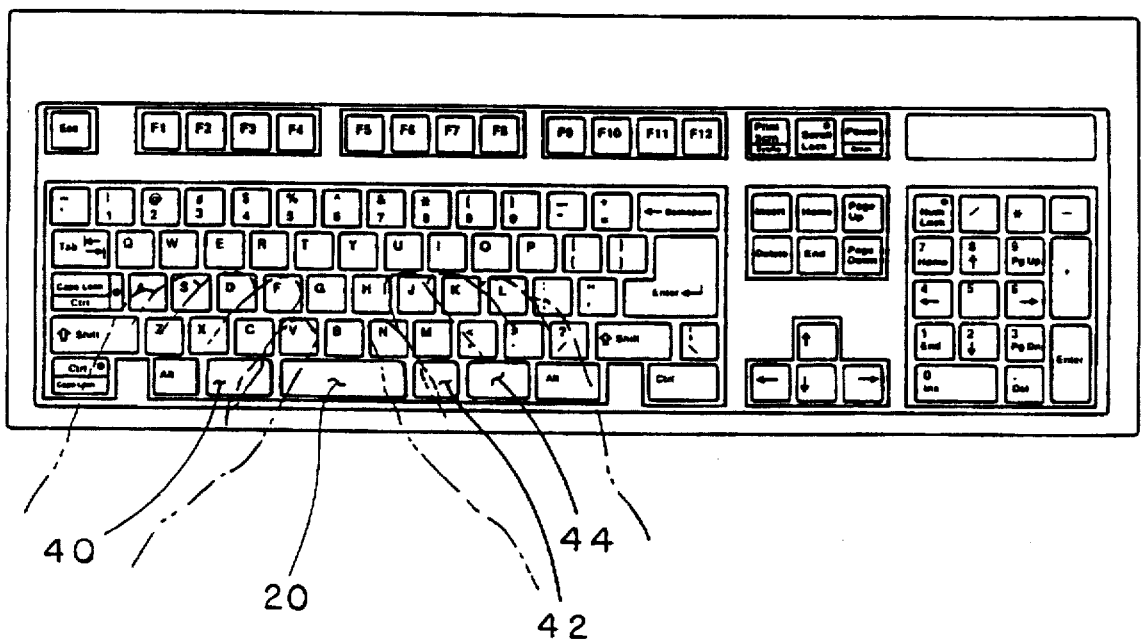

FIG. 5 shows an additional embodiment of the invention in which three non-alphanumeric keys 40, 42, 44 are placed within comfortable reach of one or two thumbs. These three keys may be arranged in any suitable fashion, one of which such arrangements is depicted in FIG. 5. Key 20 is the spacebar key and it is located in the figure such that the right thumb may activate it most easily. (Almost all touch typists only use the right thumb to activate the spacebar and do not use the left thumb at all.) The other keys may then have typical non-alphanumeric functions such as those discussed elsewhere herein. One particularly advantageous configuration comprises use of key 40 for left cursor movement, key 42 for backspace/erase, and key 44 for right cursor movement. Such a configuration permits the touch typist to move anywhere back and forth across a text line and make corrections easily and efficiently merely by using her thumbs. As in previous embodiments, multiple functions may be assigned to the keys 20, 40, 42, and 44. One possible implementation of such multiple purpose keys is

| in tandem with | key 40 function | key 42 function | key 20 function | key 44 function |
| --- | --- | --- | --- | --- |
| nothing (alone) | left cursor | backspace/erase | space | right cursor |
| shift, alt, or control | up cursor | page up | page down | down cursor |
| one of above not used | home | (insert or escape) | delete | end |
| the third of the above | move left 1 word | back/erase 1 word | delete 1 word | move right 1 word |

As with all other embodiments, i) any of the functions shown above may be interchanged with any other(s) and any may simply be deleted (not included); and ii) any other function not shown above such as one or more function keys, or backslash may be used in lieu of any function shown above. Also as in all other embodiments, any of the keys 40, 42, and 44 may be above or below the spacebar 20 as well as on either side. Any locations of keys 40, 42, 44 may be immediately adjacent spacebar 20 or may have a space between it and key 20, as in nil other embodiments as well. Key 20 may also interchange its spacing function and/or other functions with any of the keys 40,42,44. As an example, key 20 and key 42 may be interchanged. In the particular case of the above table, this would mean that the space, page down, delete, delete 1 word functions of column four may be interchanged with the backspace/erase, page up, (insert or escape), and backspace/erase 1 word functions of column three. Further, any of the keys in this or any embodiment may be programmable or otherwise capable of being set to the user's wishes. Switches accessible to the user may be used to set different keys for different functions in any embodiment.

Figure 6:
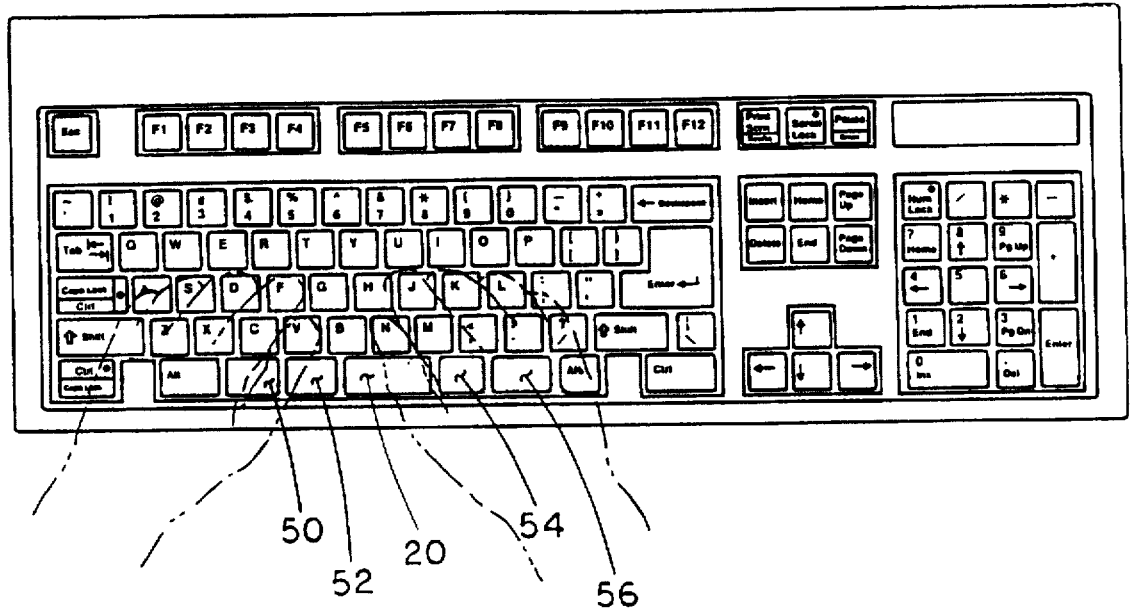
FIG. 6 shows another embodiment of the present invention with yet more generic non-alphanumeric keys.

FIG. 6 depicts one configuration of the previous embodiment in which four non-alphanumeric keys 50, 52, 54, 56 in addition to the space key 20 are within comfortable reach of one or two thumbs. As in all other embodiments, key 20 may perform one or more other functions and not the space function, while one of the other non-alphanumeric keys performs the space function. As with other embodiments, any one or more of the five keys 20,50,52,54,56 may have multiple functions when used in tandem with one or more other keys such as the shift, alt, and control keys. Listing of some possible combinations as was done in prior embodiments would be repetitions, and the present embodiment, like all others, comprises all possible allocations of non-alphanumeric functions to the five keys 20,50,52,54,56. One convenient allocation of functions may be key 50 as left cursor, key 52 as backspace/erase, key 20 as space, key 54 as right cursor, and key 56 as end. In this configuration, the typist may readily move across a line to make correction(s), and when the correcting is finished move quickly back to the end of the line where new input would begin. Other configurations comprise use of key 50 as up cursor, key 52 as left cursor, key 20 as space, key 54 as right cursor, and key 56 as down cursor with or without sub-functions (in combination with other function key(s) such as control, alt, shift) providing backspace/erase, delete, home, end and/or other non-alphanumeric functions.

Figure 7:
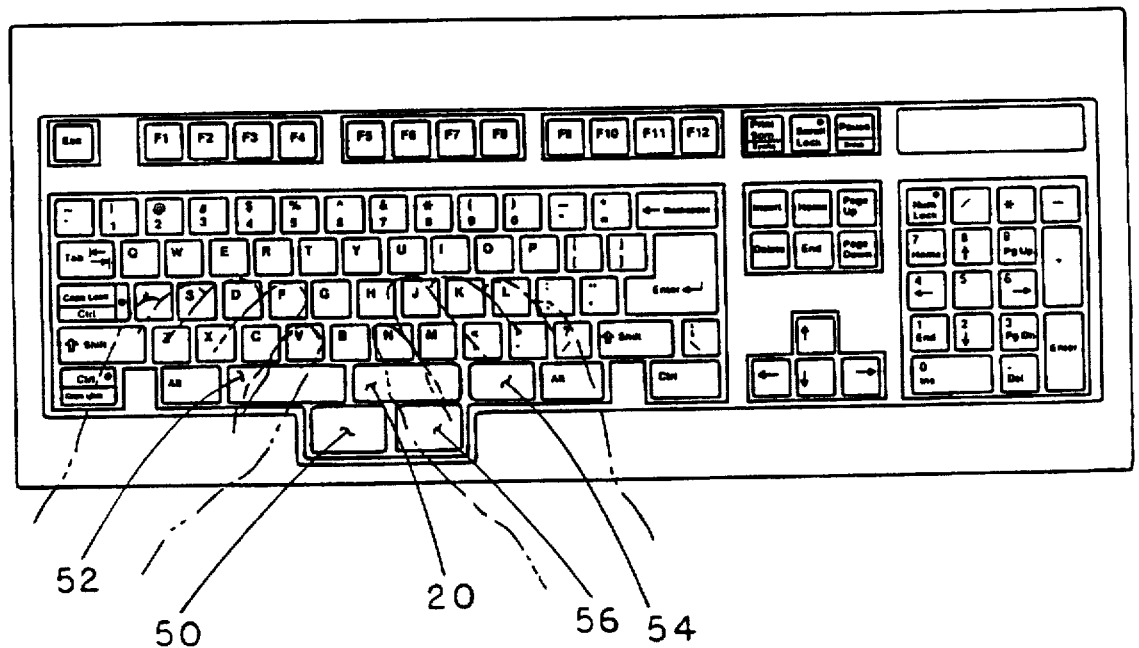
FIG. 7 shows another configuration of the present invention with non-alphanumeric keys located on either side of, and below, the spacebar.
Figure 8:
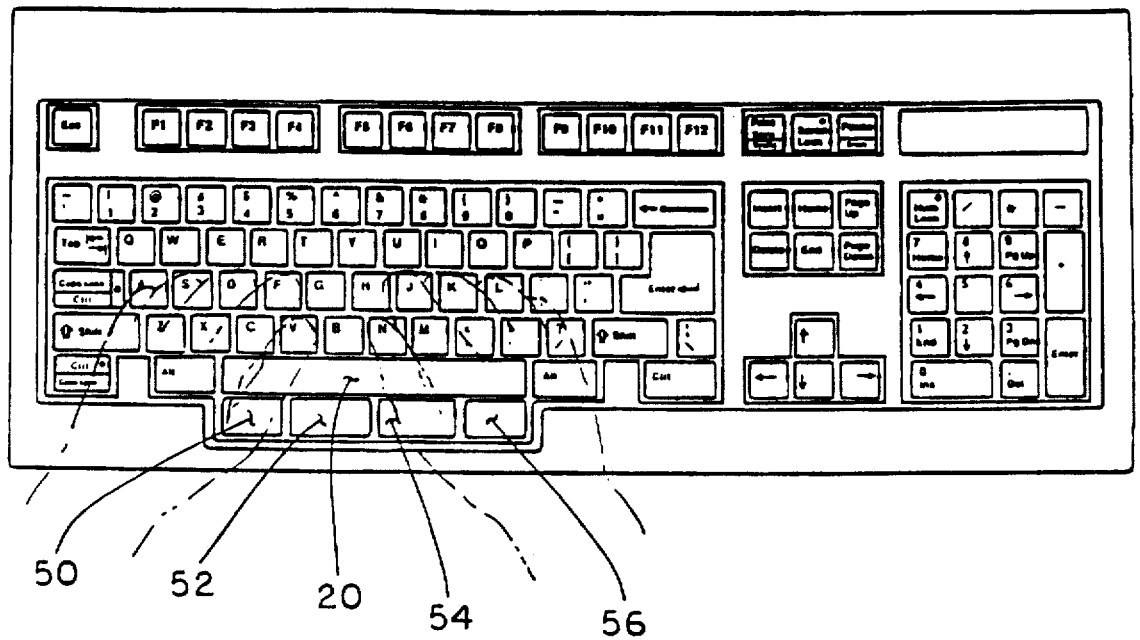
FIG. 8 shows yet another configuration with non-alphanumeric keys below the spacebar.

FIGS. 7 and 8 illustrate alternative configurations for the present embodiment. The aforementioned function allocations, or any other suitable allocations for the keys 20, 50,52,54,56, may be used in FIGS. 7 and 8, and are comprised by the invention. Locations other than those shown in FIGS. 6, 7, and 8 for the five keys 20,50,52,54,56 are also comprised by the invention. As in all other embodiments, any locations within comfortable reach of the thumbs is comprised by the invention. As but one example, in FIG. 7 the key 50 may be re-located under (on the typist side of) the key 52 and/or the key 56 may be re-located under key 54.

Figure 9:
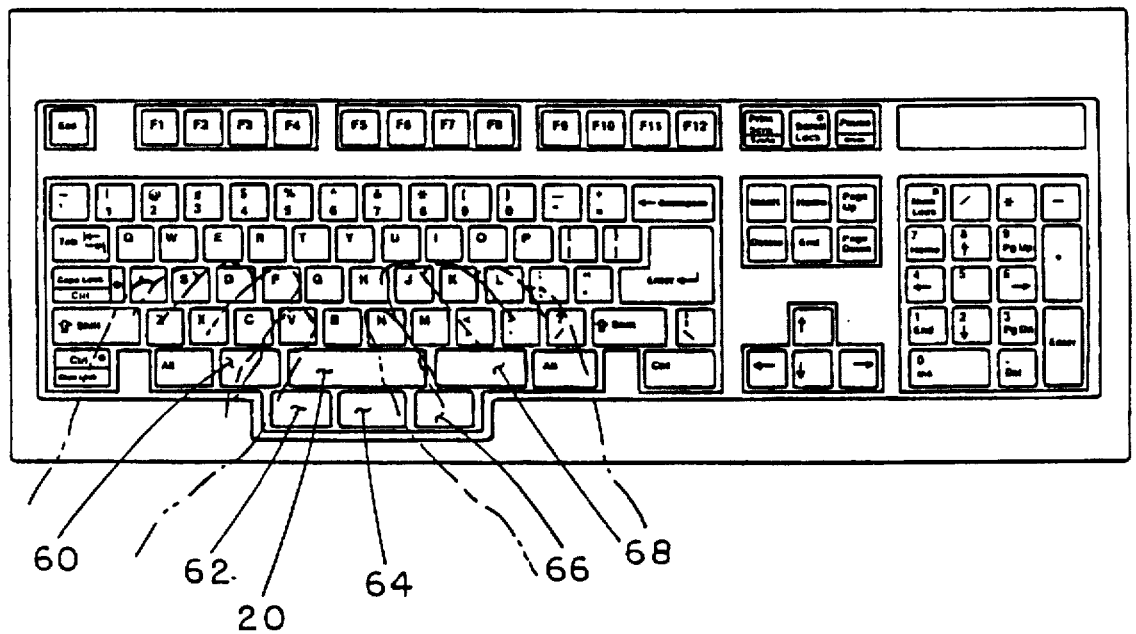
FIG. 9 shows another embodiment of the present invention with non-alphanumeric keys located on either side of and below the spacebar.
Figure 10:
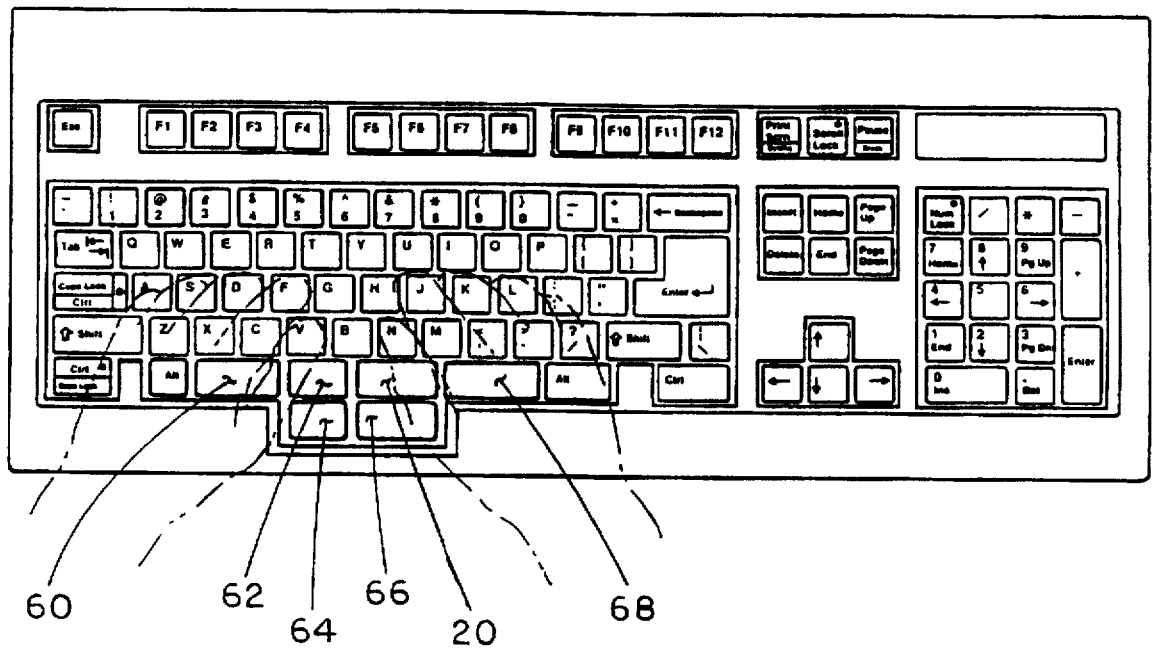
FIG. 10 shows another embodiment of the present invention which combines the invention of U.S. Pat. No. 5,143,462 with one of the aforementioned embodiments.

FIGS. 9 and 10 show configurations with five non-alphanumeric keys plus the space key 20,60,62,64,66,68 within comfortable reach of one or both thumbs. In FIG. 9 the five non-alphanumeric keys are positioned with three of said keys below the spacebar and one on either side. As in other embodiments, any possible allocation of functions to the six keys 20,60,62,64,66,68 is comprised by the invention and extensive elaboration on the possible allocations is not warranted herein. All such possible allocation combinations are obvious to those skilled in the art.

FIG. 10 illustrates use of the present invention in what may be a particularly useful combination with the invention shown in U.S. Pat. No. 5,143,462. Although any non-alphanumeric function allocation in FIG. 10 to the keys 20,60,62,64,66,68 is comprised by the invention, one particularly useful one may employ key 60 as left cursor, key 62 as backspace/erase, key 68 as right cursor, and keys 64 and 66 as up cursor and down cursor, respectively. Or keys 64 and 66 may instead be home and end keys, respectively; or delete and end keys. Keys 20 and 62 may be interchanged and their dimensions modified as suitable. As with other embodiments any sub-function allocations (i.e., in tandem with other keys such as shift, alt, control) may be employed as are suitable.

Other Embodiments

Specific embodiments shown hereinabove have comprised non-alphanumeric keys within comfortable reach of at least one thumb. Obviously the invention comprises greater numbers of such non-alphanumeric keys so located of six, seven, eight, and higher. For example, in FIG. 10, one or more additional non-alphanumeric key(s) may be located between keys 64 and 66. As such extensions of the embodiments shown herein would be obvious to those skilled in the art, they will not be elaborated on herein.

A particularly efficient mode of the invention relates to thumb activated control function operations. Virtually all word processing programs employ liberal use of the control key in tandem with other keys for many common operations. For example, holding down the control key along with the p key, typically results in printing of the current document. Control along with the s key typically saves the document. Control along with the i key results in italic typeface. In current keyboard designs, the touch typist invariably has to avert her eyes from the text and move her hand in order to depress and hold the control key. It then takes time to return the hands and eyes have to return to their prior locations in order resume typing. But with the present invention, in the thumb activated control key mode, such wastage is eliminated. Without averting the hands or eyes the touch typist can activate and hold the control key while simultaneously depressing some other key. One advantageous embodiment comprises two such control keys on either side of the spacebar (typically, but not necessarily, to the outside of each thumb) which the thumb of either hand could use to activate the control function while a finger of the opposite hand simultaneously depressed the desired additional key. This is obviously a much more convenient, efficient, comfortable, and practical means for activating control function activities.

Further, the sides of keys may be used to activate certain non-alphanumeric functions other than those activated by pressing downward on the top face. For example, the front face of either key 20 or key 30 (or both) may be used as a mouse button (or mouse buttons) for use with track balls, cursor balls, IBM's Trac Point II, or similar type cursor control means other than the standard mouse. By permitting activation of the mouse button functions by pushing on the front face (the side of the key nearest the typist) of these keys, mouse control could be done efficiently and conveniently. Further, less space would be taken up on the keyboard than is presently used for mouse button functions. Any embodiment described or implied herein may incorporate this added feature of transverse activation (for mouse buttons or other functions) into any of its keys. Any of many various mechancal/electrical means could he employed to permit such transverse activation of a given key. Two of these are described in U.S. Pat. No. 5,358,343 issued to the present inventor.

Advantages Over Prior Art

This invention can thus be seen to solve all of the problems delineated in the "Description of Prior Art" section presently associated with cursor movement and activation of other non-alphanumeric keys in a simple, novel, and manifestly ergonomic and efficient manner.

While the above description contains ninny specificities, the reader should not construe these as limitations on the scope of the invention, but merely as exemplifications of preferred embodiments thereof. Those skilled in the art will envision many other possibilities that are within its scope. For example, any of the embodiments may use any shape or dimensions of keys, including square and elongate, located in many different locations. The edges of keys shown in the figures herein are not restricted to the precise locations shown in said figures. For example, in FIG. 7 key 52 may have its right edge more to the right than as shown, with the left edge of key 20 also more to the right. As another example, in FIG. 9, the right side of key 60 and the left side of key 20 may be more to the right. The keys and the keyboard may be of any material, size, and shape, so long as said keyboard is an alphanumeric keyboard such as those typically used by touch typists. Any other mechanism which can effect the same result as a key may be substituted in any embodiment, whether implied or expressed, of the invention.

Any device which comprises non-alphanumeric keys situated on the keyboard such that they may be activated comfortably by one, either, or both thumbs is comprised by the present invention. One or more of said non-alphanumeric keys may be located directly under one or both thumbs when the hands are in the standard touch typing position or they (it) may be located away from the regions directly below the typist's thumb(s).

The invention, in its very essence and above all else, is meant to provide comfort to typists. Thumb activation of non-alphanumeric keys via thumb activation which might be possible but which is uncomfortable is certainly not the invention conceived by the present inventor. It is obvious, therefore, in the use herein of the terms "touch typing position" and "within reach of a thumb", that these terms inherently mean comfortable activation by a thumb. As but one example which is not comprised by the present invention, consider a typist having the fingertips of his hands placed on the "home row" (i.e., for a QWERT keyboard the left hand fingers would be on the a,s,d, and f keys). The typist could twist his left hand such that the fingers remained on the a,s,d, and f keys while having the left thumb depress the y key. Yet one would not consider the y key within reach of the thumb with the fingers positioned on the keys in touch typing position. Indeed, not only is striking the y key in such a position with the thumb anything but comfortable, but the fingers are certainly no longer in touch typing position when it is done either. Hence any positioning of non-alphanumeric keys such that the fingers (hands) are twisted or contorted out of the normal configuration in which they are used during touch typing is not comprised by the present invention. As a further example, on a QWERT keyboard it is possible to place keys in the row of the spacebar adjacent at least part of the x,z, comma, or period keys which could be reached by thumbs by contorting and twisting the hands, but which could hardly be thumb activated comfortably. In such thumb activation the fingers would no longer be positioned on the keys in touch typing position and hence such key positioning would not be comprised by the present invention. Hence use of the term "within reach of the thumbs" as used herein means within comfortable reach of the thumbs with the hands remaining in touch typing position.

The use of the term "fingers" comprises the thumbs (i.e., comprises all five digits of a hand) unless used specifically to reference the four fingers in contradistinction to the thumb. Additionally, stating that the hands are positioned in touch typing position is equivalent to stating that the fingers are positioned in touch typing position.

Figure 12:
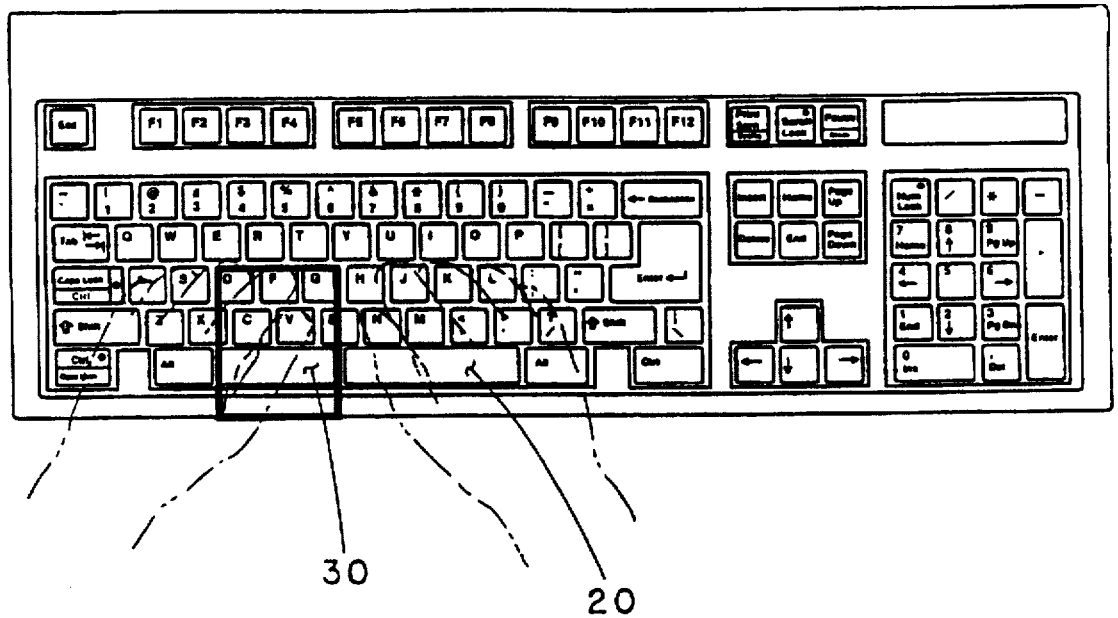
FIG. 12 shows an outlined region of a keyboard within which region the thumb activated non-alphanumeric key(s) may be located.
Figure 13:
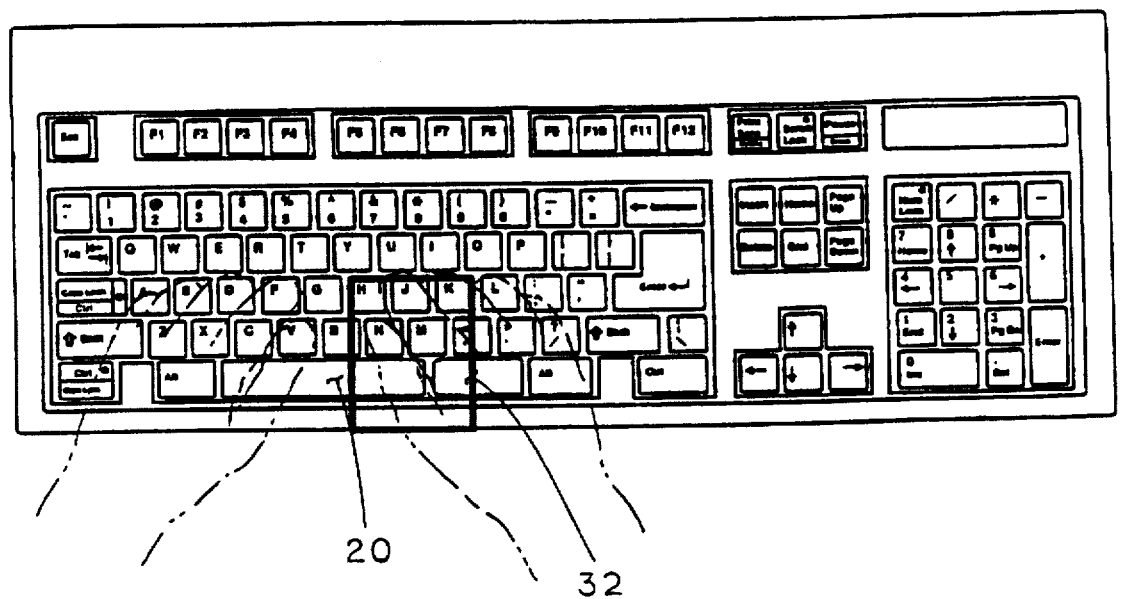
FIGS. 13 shows an other outlined region of a keyboard within which region the thumb activated non-alphanumeric key(s) may be located.

FIGS. 12 and 13 provide an aid to understanding the idea of comfort and ease comprised by thumb activation as in the present invention. In FIG. 12 the region which may be considered comfortable thumb activation may extend as far as shown in the box outlined. FIG. 13 shows a similar region. These regions may be defined with the following language:

Said region of the keyboard may be considered bounded by a straight first line segment extending from a first key upon which a middle finger rests when hands and fingers are in touch typing position to a second key located adjacent an index finger key upon which an index finger rests; a second straight line segment perpendicular to the first line segment intersecting one endpoint of the first line segment; a third straight line segment perpendicular to the first line segment intersecting an other endpoint of the first line segment; and an edge of the keyboard intersected by said second and third straight lines.

An alternative description is:

Said region of the keyboard may be considered bounded by two keys adjacent left and right sides of an index finger key upon which an index finger rests when hands and fingers are in touch typing position, a near edge of the keyboard nearer the typist than any other edge, and two lines intersecting the near edge perpendicular to said near edge.

Yet another description of the region(s) is:

Said region of the keyboard may be considered bounded by a first line passing from the center of two middle finger keys upon which two middle fingers rest when hands and fingers are in touch typing position, a second line passing from the center of the left middle finger key perpendicular to the first line, a third line passing from the center of the right middle finger key perpendicular to the first line, and an edge of the keyboard nearer the typist than any other edge.

These descriptions are not limited to the specific keyboard designs shown in FIGS. 12 and 13, but apply generically to any keyboard design.

Another way of considering the region considered "within (comfortable) reach of a thumb" is to define it in terms of distance measured in inches. Hence if one were to consider the location where the thumb touches during touch typing when it activates a space (or a backspace/erase according to U.S. Pat. No. 5,143,462) then "comfortable" may be defined as roughly within an inch of said location. It may possibly be somewhat greater than this number, but using the "one inch" value may assist in expressing the invention in appropriate claim language.

"Comfortable" may also be defined as being within a certain number of key widths from the same location where the thumb normally touches down during touch typing. On a QWERT keyboard, for example, the left thumb normally touches down just down the v key (the right thumb just below the n key). In that context, a comfortable range may be defined in terms of one and a half key widths.

Figure 11:
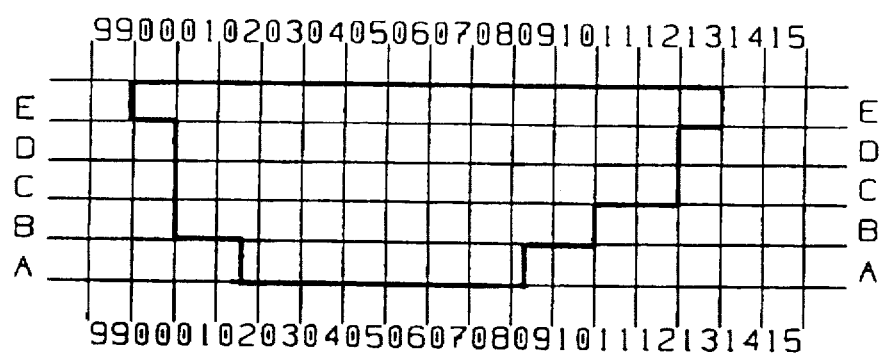
FIG. 11 shows the prior art keyboard grid numbering scheme figure published by the International Organization for Standardization wherein each column is designated by a two digit number and each row by a letter.

In the standard keyboard for which the ISO standards are being formulated by the International Organization for Standardization the rows and columns are designated via a grid (see FIG. 11) in which two digit numbers are used for columns and letters are used for rows. The spacebar in a standard keyboard version being considered for the ISO standards is located in the A row from columns 03 to 07, i.e., from A03 to A07. The present invention is not limited to the standard keyboard addressed by the ISO standards keyboard as referenced by FIG. 11. (A copy of the ISO standards dated Jun. 20, 1991 is included with the prior art reference material supplied with the present application.) In such keyboards, however, the non-alphanumeric key(s) which may be thumb activated according to the present invention may be located anywhere on the A row within comfortable reach of one or two thumbs. Typically, such non-alphanumeric key location (s) according to the present invention may be anywhere, in whole or in part, within the region A03 to A07, i.e., the location of the standard spacebar in conventional (ISO standard) keyboards. One or more may also be located below the A row (nearer the typist than the A row). Typically, such thumb activated keys may be situated, in whole or in part, between columns 01 and 12. For example, in FIG. 2 key 30 may extend, at least in part, over regions A03, A04, and/or A05. It may even extend over A02 and or A06. Row and column designations for other embodiments with other numbers and/or locations of non-alphanumeric keys is obvious. In some embodiments, a row under the A row is employed and, for present purposes, this row may be desisted row AA. Embodiments with keys in row AA would then have non-alphanumeric keys located in columns anywhere between AA01 and AA12.

The invention is not limited to keyboards designed as shown in the figures. For example, "split" keyboards having left and right sections which may be detached and separate from one another are comprised by the invention. So are single piece construction keyboards with alphanumeric (and possibly non-alphanumeric) keys arranged in groups which are separate from each other. For example, a single piece keyboard framework may have a group of keys on the left reachable by the left hand fingers separated in space from a group of keys on the right reachable by the right hand fingers.

The word pressure when used herein as applied to a key may also be interpreted as movement or touch. Activation does not necessarily have to be by downward depression, but may be by other means as well. The electromechanical means for activating each function, i.e., the "switching" or other means, for sending the appropriate signal to the computer when a given key is activated is not relevant to the working of the invention. Such means are common, and are both trivial and well known to those skilled in the art. The present invention entails novel placement of particular keys and is suitable for use with any suitable electromechanical means for activation.

Key locations other than those shown explicitly herein are comprised by the invention, so long as the non-alphanumeric keys delineated herein are within comfortable reach of one or two thumb(s). For example, non-alphanumeric keys located above or below (nearer or further from the typist's body) the spacebar (i.e., along an edge) are comprised by the invention, as are non-alphanumeric keys located above or below the spacebar row in combination with being to either side of one or both end(s) of the spacebar. (In the present context, "end" refers to a short side of an elongate key such as the standard spacebar, and "edge" refers to a long side of such a key.) One or more of the non-alphanumeric keys may be adjacent the spacebar, may have a region devoid of keys between it (them) and the spacebar, or may have one or more other keys between it (them) and the spacebar. Other possible variations are obvious to those skilled in the art, and the invention is not limited to the particular configurations explicitly shown herein.

Any location for non-alphanumeric keys positioned on the typist side of any of the alphanumeric keys x,c,v,b,n,m, comma, and period keys is comprised by the invention. Said non-alphanumeric keys may be adjacent said alphanumeric keys or may have a region, with or without other keys, therein between as long as they may be activated comfortably by a touch typist's thumb(s).

Combinations of any of the embodiments described hereinabove are comprised by the invention. Combinations of any embodiment(s) of the present invention with prior art are also comprised by the invention. For example, any embodiment may be combined with the "Thumble-ina" device described under prior art, or with any other prior art device.

The invention comprises any of the embodiments expressed or implied herein wherein any of such keys may be ergonomically activated by one or both thumbs with one or two hands in touch typing position. Further, any keyboard utilizing the invention may be programmable or changeable by means of switching or otherwise such that the function(s) performed by any one of the keys shown in this invention may be changed to suit the desire of the typist. Any allocation of any of the non-alphanumeric functions described herein to any keys which are located such that they may be comfortably thumb activated by a touch typist with hands in touch typing position without interrupting the touch typing process is comprised by the invention.

All comments made in any embodiment which are of a genetic nature are applicable to all possible embodiments of the invention. Further, the invention is not restricted to computer and electric typewriter keyboards but can be used in any type of input typing system.

Accordingly, the scope of the invention should be determined not by the embodiments described, but by the appended claims and their legal equivalents.

I claim:

1. A keyboard for a computer, electronic typewriter, word processor or the like, comprising:
    a plurality of alphanumeric keys comprising twenty-six alphabetic keys and ten numeric keys arranged corresponding to touch typing position each of which alphanumeric keys automatically effects a different alphanumeric character,
    a plurality of non-alphanumeric keys,
    said plurality of alphanumeric keys including left and right middle finger keys upon which middle fingers of a touch typist are positioned when said touch typist's hands and fingers are at rest in touch typing position,
    a near edge of the keyboard nearer a touch typist than any other edge, and
    a means to backspace/erase which automatically causes both backspacing to, and erasure of, a typed character wherein at least part of said means to backspace/erase is positioned within a region of the keyboard bounded by a first line passing through the respective centers of the left and right middle finger keys, a second line passing from the center of the left middle finger key perpendicular to the first line, a third line passing from the center of the right middle finger key perpendicular to the first line, and the near edge of the keyboard,
    whereby means is provided for ergonomic activation of the backspace/erase key by a touch typist.

2. The keyboard of claim 1 wherein
    the means to backspace/erase is positioned within reach of both thumbs of a touch typist without moving hands from touch typing position.

3. The keyboard of claim 1 wherein
    said means to backspace/erase is an elongated key, and
    said elongated key is directly under both thumbs of a touch typist with hands resting in touch typing position.

4. The keyboard of claim 1 wherein
    at least part of said means to backspace/erase is positioned adjacent at least part of the b key.

5. The keyboard of claim 1 wherein
    at least part of said means to backspace/erase is positioned adjacent at least part of the v key.

6. The keyboard of claim 1 wherein
    at least part of said means to backspace/erase is positioned adjacent at least part of the c key.

7. The keyboard of claim 1 wherein
    at least part of said means to backspace/erase is positioned adjacent at least part of the n key.

8. The keyboard of claim 1 wherein
    at least part of said means to backspace/erase is positioned adjacent at least part of the m key.

9. The keyboard of claim 1 further comprising at least one space key, and wherein
    the means to backspace/erase and said at least one space key are positioned so as to enable a touch typist having hands in touch typing position to activate the means to backspace/erase with one thumb and to activate the at least one space key with an other thumb without movement of hands from a touch typing position
    thereby providing a touch typist with a means to use one thumb exclusively for spacing and the other thumb exclusively for backspacing/erasing.

10. The keyboard of claim 9 wherein
    at least part of the means to backspace/erase is a backspace/erase key located directly under at least part of one thumb and at least part of the space key is located directly under at least part of the other thumb with the hands resting in touch typing position.

11. The keyboard of claim 1 wherein
    the means to backspace/erase is positioned within reach of a left thumb of a touch typist without movement of hands from touch typing position.

12. The keyboard of claim 11 wherein
    at least part of the means to backspace/erase is directly under at least some portion of the left thumb with hands resting in touch typing position.

13. The keyboard of claim 11 wherein
at least part of the means to backspace/erase is directly under at least some portion of a right thumb with hands resting in touch typing position.

14. The keyboard of claim 11 wherein
the means to backspace/erase is positioned outside the reach of the right thumb with hands in touch typing position.

15. The keyboard of claim 1 wherein
the means to backspace/erase is positioned within reach of a right thumb of a touch typist without movement of hands from touch typing position.

16. The keyboard of claim 15 wherein
at least part of the means to backspace/erase is directly under at least some portion of the right thumb with hands resting in touch typing position.

17. The keyboard of claim 15 wherein
at least part of the means to backspace/erase is directly under at least some portion of a left thumb of a touch typist with the hands resting in touch typing position.

18. The keyboard of claim 15 wherein
the means to backspace/erase is positioned outside the reach of the left thumb with hands in touch typing position.

19. The keyboard of claim 1 further comprising a space key wherein
the space key is directly underneath at least one thumb with the hands resting in touch typing position, and the means to backspace/erase is located farther from the near edge of the keyboard than the space key.

20. The keyboard of claim 1 further comprising at least one space key, and wherein
said at least one space key is split into at least two sections, the means to backspace/erase being one of the at least two sections.

21. The keyboard of claim 5 wherein
the means to backspace/erase is a key and said key is activated by depression downwards.

22. A keyboard for a computer, electronic typewriter, word processor, and the like, comprising:
a plurality of alphanumeric keys arranged corresponding to touch typing position according to international row and column designations,
a plurality of non-alphanumeric keys,
said plurality of alphanumeric keys including left and right middle finger keys upon which middle fingers of a touch typist are positioned when said touch typist's hands and fingers are at rest in touch typing position,
a near edge of the keyboard nearer a touch typist than any other edge, and
a means to backspace/erase which automatically causes both backspacing to, and erasure of, a typed character wherein at least part of said means to backspace/erase is positioned within a region of the keyboard bounded by a first line passing through the respective centers of left and right middle finger keys, a second line passing from the center of the left middle finger key perpendicular to the first line, a third line passing from the center of the right middle finger key perpendicular to the first line, and the near edge of the keyboard,
whereby means is provided for ergonomic activation of the backspace/erase key by the touch typist.

23. The keyboard of claim 22 wherein
at least part of the means to backspace/erase is located at least in part in column 04.

* * * * *